United States Patent [19]

Anhalt

[11] Patent Number: 5,357,402
[45] Date of Patent: Oct. 18, 1994

[54] CARD-RECEIVING ELECTRONIC DEVICE HAVING GROUNDING SPRING

[75] Inventor: John W. Anhalt, Orange, Calif.

[73] Assignee: ITT Corporation, Secaucus, N.J.

[21] Appl. No.: 857,914

[22] PCT Filed: Feb. 24, 1992

[86] PCT No.: PCT/US92/01565

§ 371 Date: May 15, 1992

§ 102(e) Date: May 15, 1992

[87] PCT Pub. No.: WO93/17471

PCT Pub. Date: Sep. 2, 1993

[51] Int. Cl.$^5$ ........................... H05K 5/00; H05K 5/02
[52] U.S. Cl. ..................................... 361/753; 174/51; 361/756; 361/220
[58] Field of Search ............... 361/212, 220, 736, 752, 361/753, 816, 756, 817, 818; 174/51, 35 R, 35 GC, 35 MS; 439/607, 608, 609, 610

[56] References Cited

U.S. PATENT DOCUMENTS

| | | |
|---|---|---|
| 3,200,361 | 8/1965 | Schwartz et al. |
| 3,926,496 | 12/1975 | Occhipinti |
| 4,780,570 | 10/1988 | Chuck ................................. 174/35 |
| 4,955,817 | 9/1990 | Sugai ..................................... 439/60 |
| 5,044,988 | 9/1991 | Hirayama ............................ 439/571 |
| 5,162,980 | 11/1992 | Morgan et al. .................... 174/35 R |
| 5,223,670 | 6/1993 | Hogan et al. ...................... 174/35 R |

FOREIGN PATENT DOCUMENTS 0228278 12/1986 European Pat. Off. .

*Primary Examiner*—Leo P. Picard
*Assistant Examiner*—Bot Ledynh
*Attorney, Agent, or Firm*—Thomas L. Peterson

[57] ABSTRACT

A grounding spring is provided for discharging static electricity on a card as the card is inserted into an electronic device and for thereafter grounding the card, which minimizes electromagnetic radiation during electrostatic discharge in a simple and easily mounted construction. The grounding spring (60, FIG. 3) is formed of sheet metal and has a card-engaging part 64 lying within a recess of a card-guiding track (72). The grounding spring has a downwardly extending leg (90) that extends down into a hole (92) of a circuit board lying under the card-receiving mechanism, and has a substantially 180° loop (112) connecting the card-engaging part to the downward leg.

6 Claims, 5 Drawing Sheets

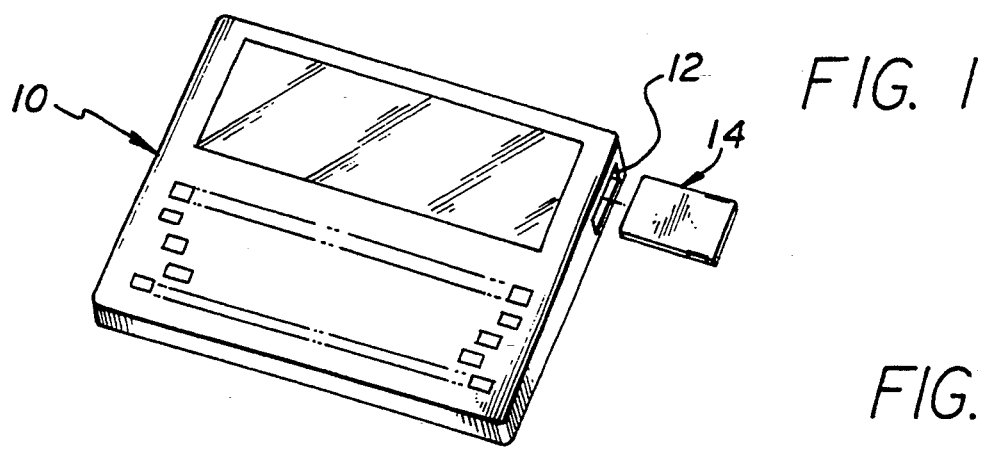
FIG. 1
FIG. 2
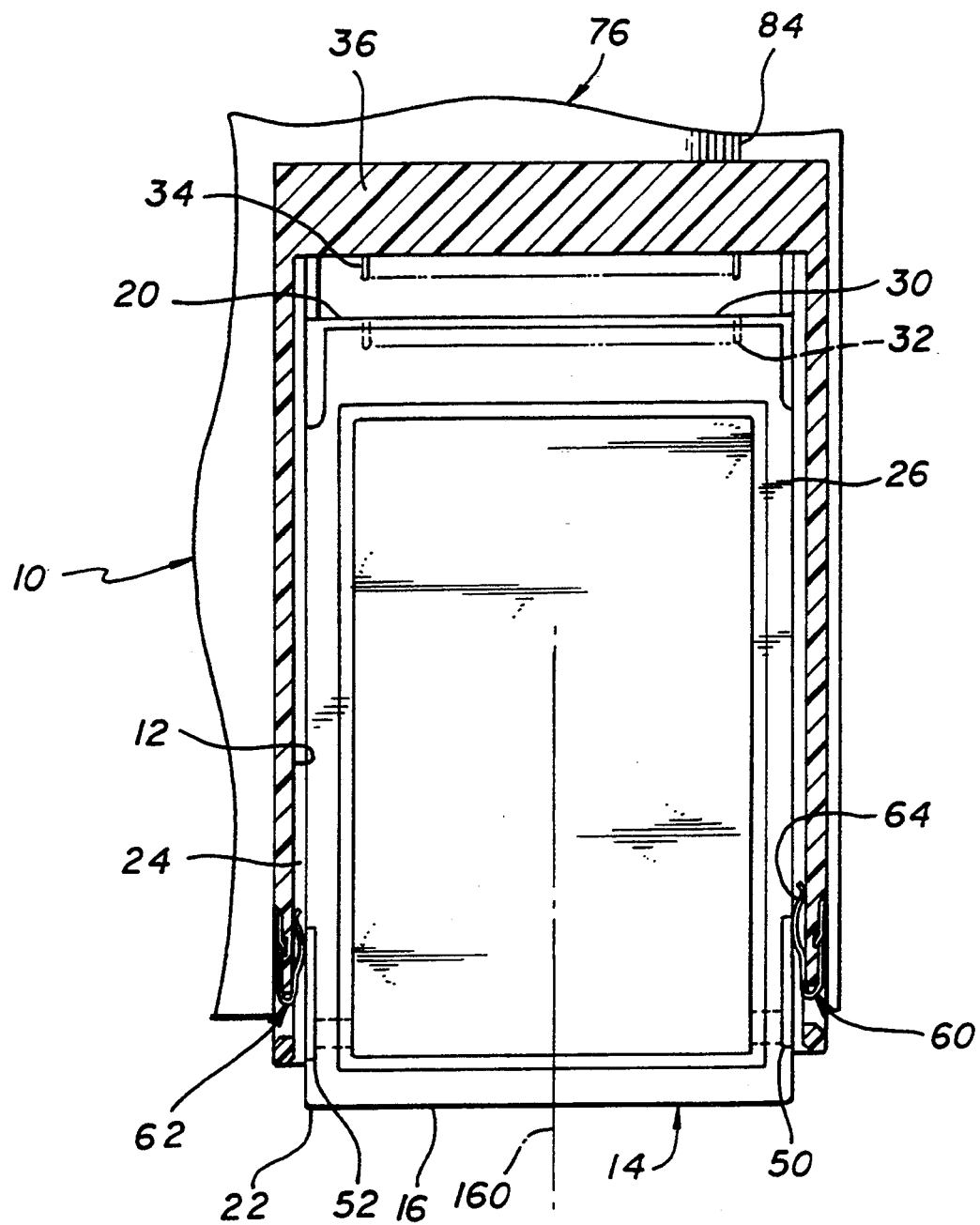

FIG. 8
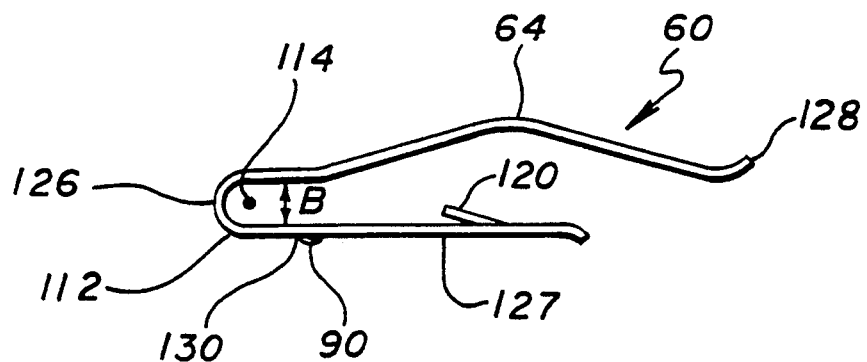
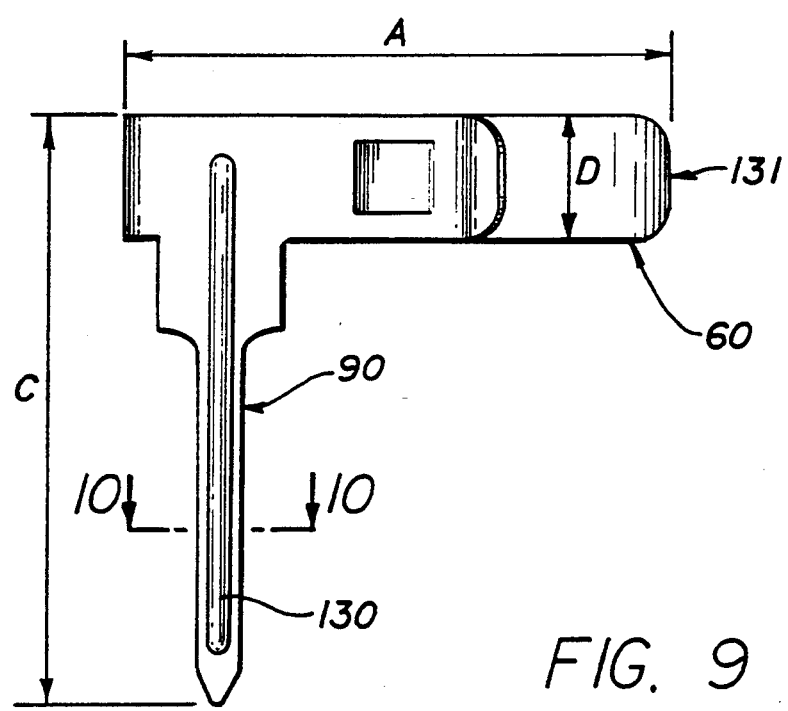
FIG. 9
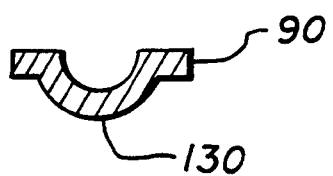
FIG. 10

CARD-RECEIVING ELECTRONIC DEVICE HAVING GROUNDING SPRING

BACKGROUND OF THE INVENTION

Memory cards commonly include a circuit board that holds integrated circuits, and a connector at the front of the card for connecting to a corresponding connector in an electronic device that receives the card. Standard JEIDA cards have a thickness of five millimeters, which enables them to be inserted into thin electronic devices.

The cards can hold a considerable static charge having a potential of ten thousand volts or more, which should be dissipated prior to mating of signal contacts of the card and device. Memory cards are currently provided with grounding contacts as well as signal contacts at the front of the card, but there is danger that a static discharge can occur between signal contacts prior to mating of the grounding contacts. A static discharge system which provided early discharge of static electricity from a memory card, in a construction that minimized the effects of an electromagnetic pulse created during sudden discharge, and which was of relatively simple and reliable construction, would be of considerable value.

SUMMARY OF THE INVENTION

In accordance with one embodiment of the present invention, a combination card and card-receiving electronic device is provided, which assures early discharge of static electricity on the card and thereafter keeps the rear portion of the card grounded, in a design that minimizes adverse effects of the rapid static electricity discharge, in a low cost and reliable construction. The electronic device includes a card-receiving mechanism having a pair of horizontally-extending tracks for guiding the card into the device. A grounding spring is provided which includes a card-contacting part positioned along one of the guide track, and a downwardly-extending leg whose lower part is connected to a ground plane of a circuit board lying directly under the card-receiving mechanism. The first track has a track hole, and the grounding spring has a substantially 180° loop extending around one edge of the track hole, with one side of the loop connected to the card-engaging part and the other side of the loop connected to the top of the leg.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a memory card and an electronic device in the form of a lap top computer, constructed in accordance with the present invention.

FIG. 2 is a sectional top view of the memory card and a portion of the electronic device of FIG. 1, shown with the card partially inserted into the electronic device.

FIG. 8 is a plan view of the grounding spring of FIG. 5.

FIG. 9 is a front elevation view of the grounding spring of FIG. 8.

FIG. 10 is a sectional view taken on the line 10—10 of FIG. 9.

DESCRIPTION OF THE PREFERRED EMBODIMENT

Figure 3:
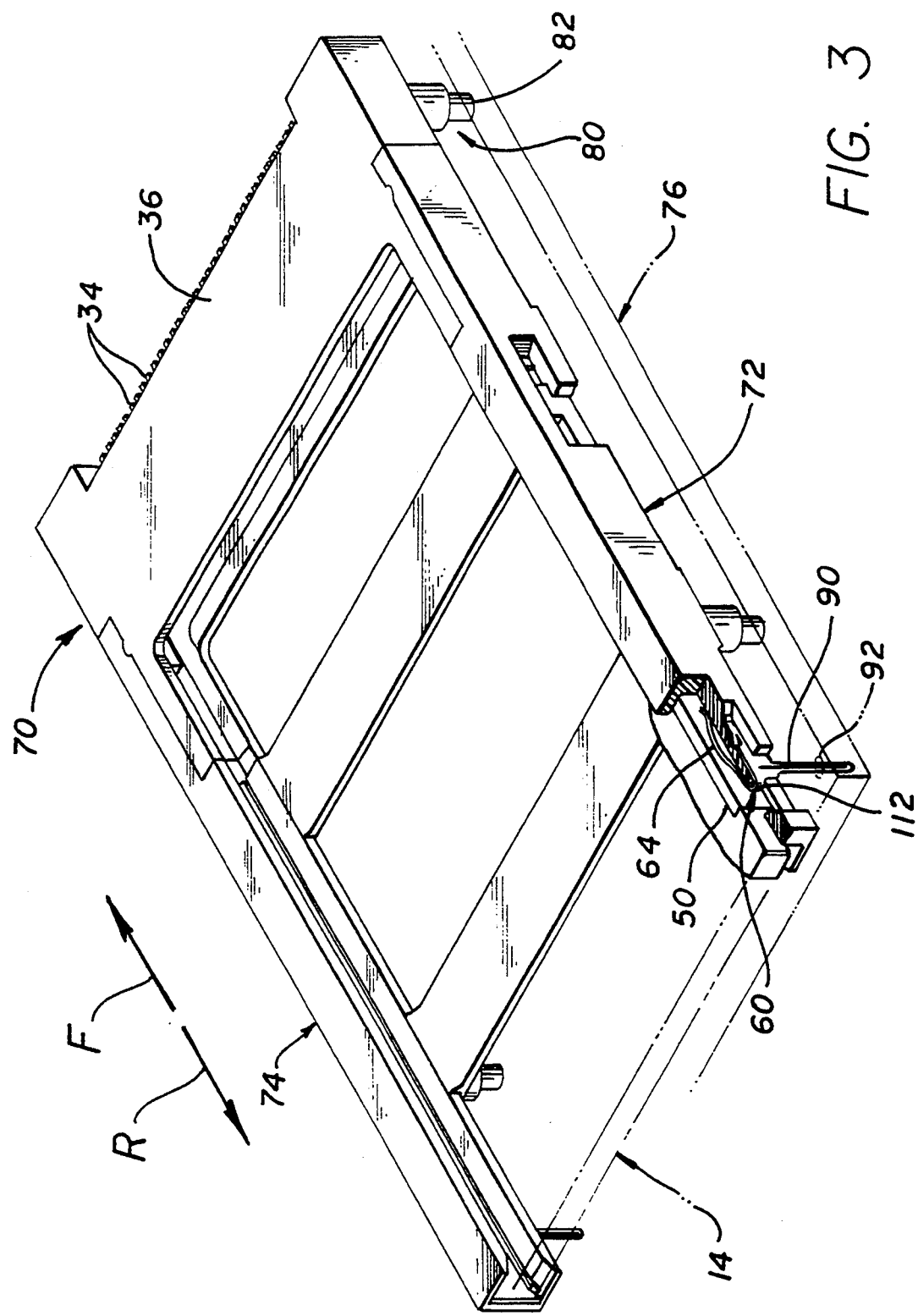
FIG. 3 is a partial isometric and sectional view of the card-receiving mechanism of FIG. 2, showing a portion of a card received therein and showing, in phantom lines, a portion of a circuit board on which the mechanism is mounted.

FIG. 1 illustrates an electronic device 10 in the form of a lap top computer, which has a card-receiving slot 12 that receives an integrated circuit card 14. FIG. 2 shows the card 14 as it is being inserted into the slot 12. The memory card includes a card frame 16 with front and rear ends 20, 22 and opposite sides 24, 26. A connector 30 lies at the front end of the card and has multiple socket contacts 32 that mate with multiple pin contacts 34 on a frame connector 36 lying at the front of the slot, when the card is in its fully inserted position.

Figure 4:
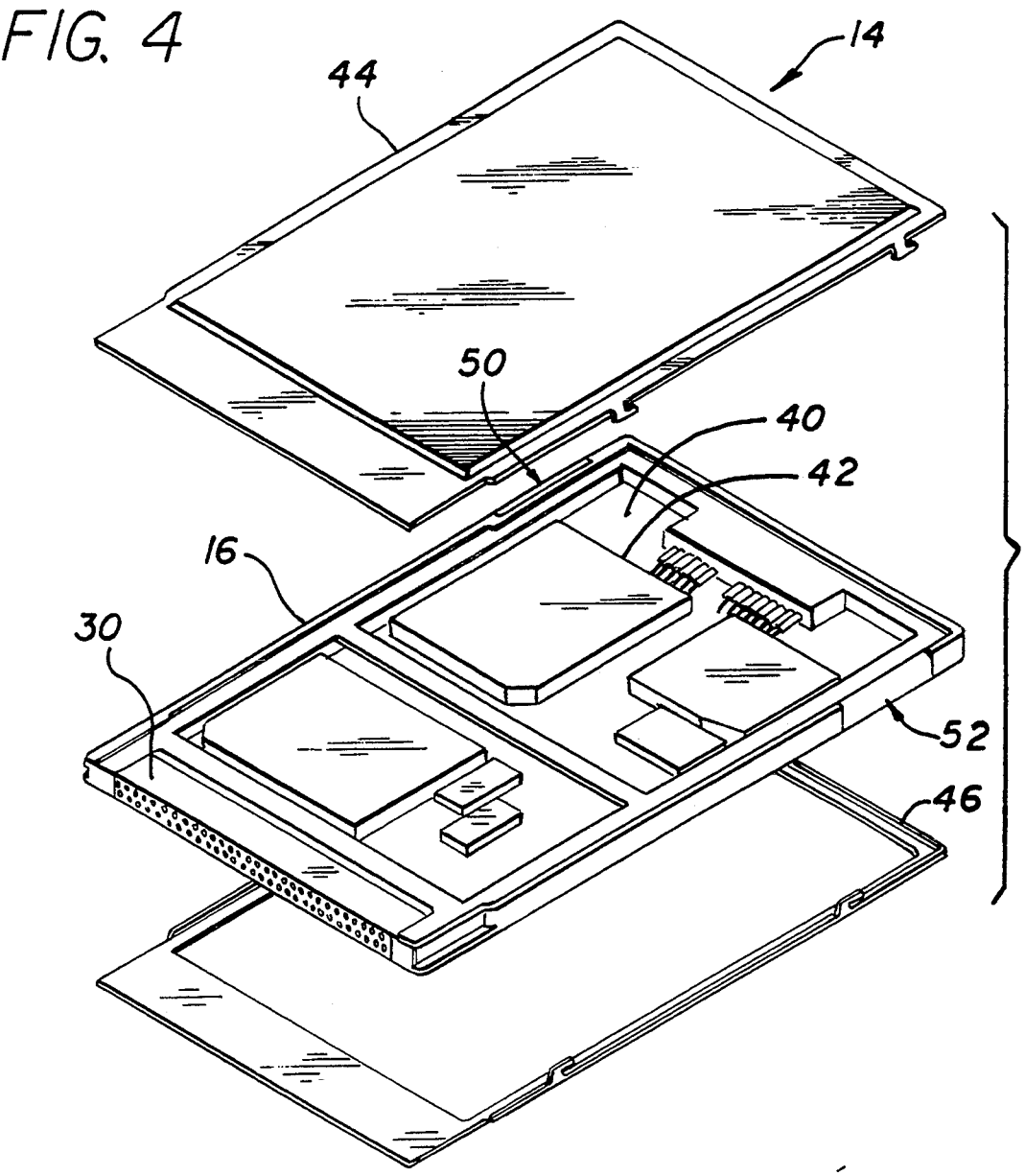
FIG. 4 is an exploded isometric view of the memory card of FIG. 2.
Figure 6:
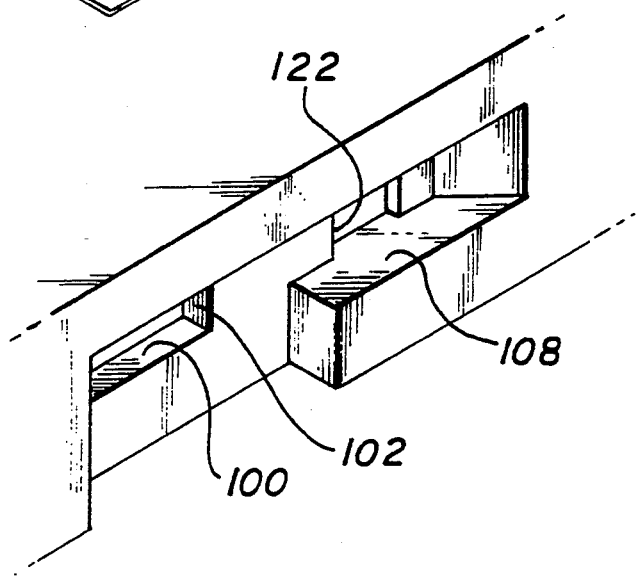
FIG. 6 is an enlarged isometric view of a portion of the device of FIG. 5 but without the grounding spring.

FIG. 4 shows details of the memory card 14 which includes the frame 16 and connector 30. A card circuit board 40 is mounted on the frame and has electronic circuitry formed by a plurality of integrated circuit components 42. A pair of metal covers 44, 46 mount to the top and bottom of the frame. The frame 16 is formed of dielectric material or material of low electrical conductivity. A pair of metal card ground contacts in the form of clips 50, 52 are connected to a ground plane (not shown) of the card circuit board 40. The clips 50, 52 are provided to enable discharge of static electricity from the card and to maintain the rear portion of the circuit board, opposite the connector 30, at ground potential to aid in EMI (electromagnetic interference) protection.

FIG. 2 shows a pair of grounding springs 60, 62 which engage the card clips 50, 52. The springs engage the clips prior to the connectors 30, 36 approaching each other closely enough for a spark to pass between the signal contacts of contacts 32, 34. Each grounding spring 60 has a card-engaging part 64 that engages a corresponding clip 50 of the card.

FIG. 3 illustrates details of a card-receiving mechanism 70 of the electronic device, which includes first and second guide tracks 72, 74 that guide the card 14 in horizontal, longitudinal forward and rearward movement (in directions F, R) into and out of the electronic device. The electronic device includes a circuit board 76 lying under the card-receiving mechanism. The mechanism includes four feet 80 with lower parts 82 that fit into holes of the circuit board. The pin contacts 34 of the frame connector 36 engage conductive traces 84 (FIG. 2) on the circuit board 76.

The grounding spring 60 has a downwardly-extending leg 90 that extends into a grounding hole 92 formed in the circuit board. Thus, when the card-engaging part 64 of the grounding spring engages the card clip 50, current flows from the card clip and through the grounding spring 60 to the grounded hole 92 in the circuit board.

Figure 7:
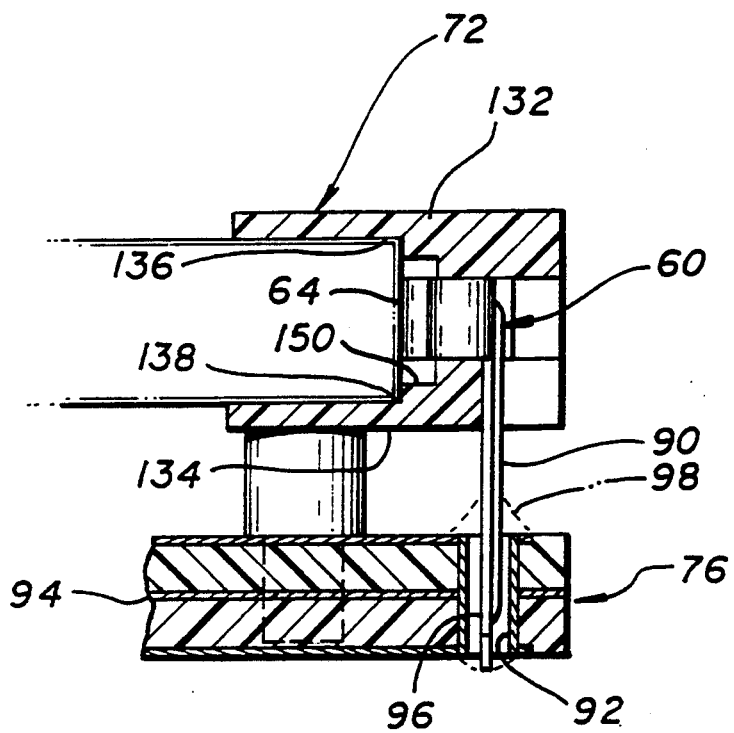
FIG. 7 is a partial sectional front view of the card-receiving mechanism and card of FIG. 5, and also showing the mechanism mounted on a circuit board but prior to a soldering operation.

As shown in FIG. 7, the circuit board 76 has a ground plane 94 which is maintained at a constant (usually ground) potential, which is the same potential at which a ground plane of the circuit board in the card should be maintained. The grounding hole 92 in the circuit board is electrically connected to the ground plane 94 of the circuit board. A lower end 96 of the grounding spring leg 90 lies in the grounding hole 92 which has plated walls. The plated walls will be soldered to the leg by solder indicated at 98 after a wave soldering process is employed during construction.

Figure 5:
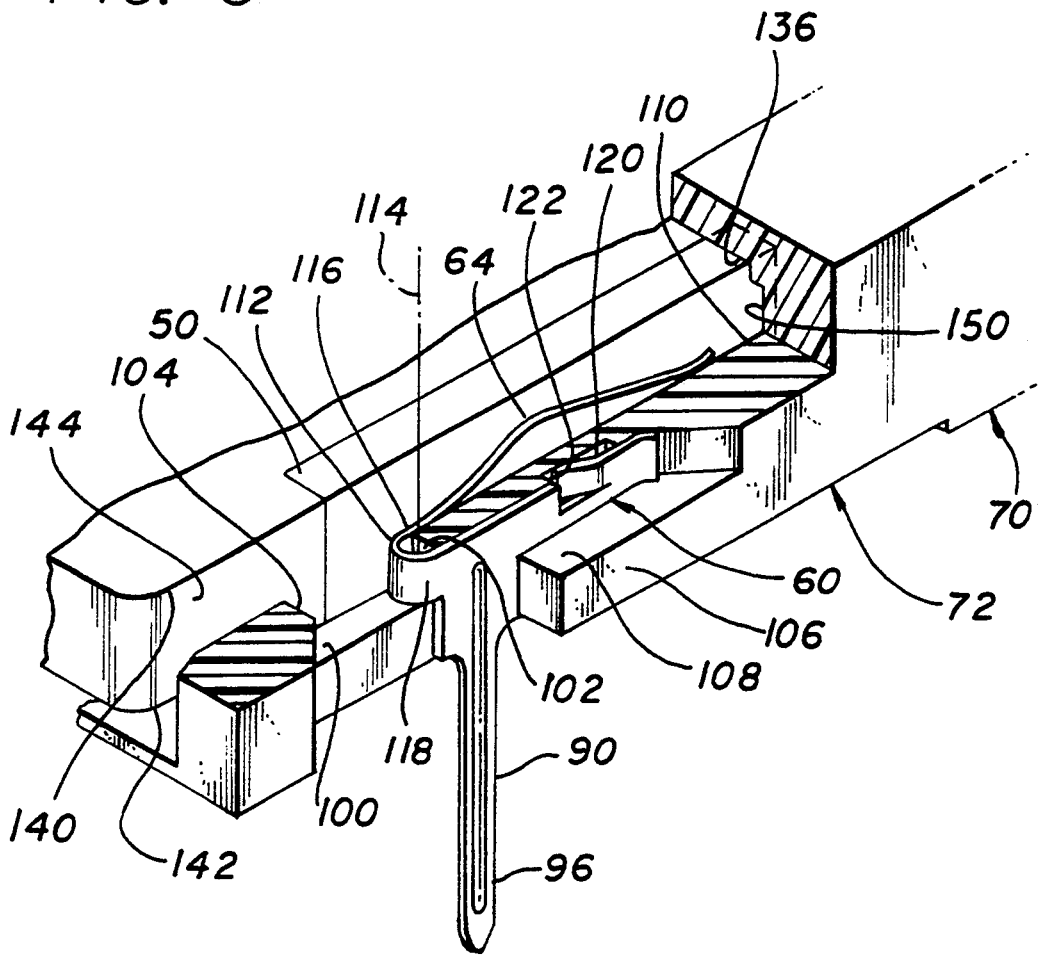
FIG. 5 is an enlarged sectional isometric view of a portion of the card and electronic device of FIG. 3.

Referring to FIG. 5, it can be seen that the first longitudinally-extending guide track 72 has a laterally-extending track hole 100 forming front and rear track hole end walls 102, 104. The outer side 106 of the track also has a cutaway portion 108 beside the track hole. The portion of the inner side 110 of the track which lies beside the track hole does not have such a cutaway. The grounding spring 60 has a substantially 180° loop 112 curved about a vertical axis 114, with the inner side 116 of the loop merging with the card-engaging part 64, and with the outer side 118 of the loop merging with the downwardly extending leg 90. The spring clip has a retention finger 120 which abuts a forwardly-facing shoulder 122 on the track to prevent rearward movement of the grounding clip after it has been installed by forward movement into the track hole 100.

When the card is moved forward sufficiently for the card-engaging part 64 of the grounding spring to engage the card clip 50, a brief current pulse can pass through the grounding clip, from the card-engaging part 64, around the loop 112, and down along the leg 90 to the ground plane of the circuit board that lies under the card-receiving mechanism. Although only a small charge may be built up on the card, it may have a large voltage above ground, such as ten thousand volts or more. The low resistance conductive path along the grounding spring 60, can result in a short pulse, but one with considerable current. As the current pulse passes through the grounding spring 60, the current pulse results in emission of electromagnetic energy. The short part that muse be traversed by the current pulse, from the curved finger-like card-engaging part 64, around the loop 112, and down along the leg 90, results in minimal electromagnetic emission. Of course, once the current reaches the ground plane of the circuit board lying below the card-receiving mechanism, the current density is reduced as the current is distributed over the large area of the ground plane of the circuit board. Thus, the direct connection provided by the grounding spring, between the card clip 50 and the ground plane-connected plated hole of the circuit board, results in minimum emission of electromagnetic energy by the pulse created during dissipation of electrostatic charge on the card.

FIGS. 8–10 illustrate details of the grounding spring 60, which is formed from sheet metal. The simple substantially 180° loop 112 at the rear end 126 of the ground spring enables simple installation of the ground spring. The spring is installed by inserting its front end 128 through the track hole 100 while the side 127 opposite the card-engaging part lies on the outer side of the front track hole wall. During insertion the retention finger 120 snaps into place and the loop 112 at the front end closely encircles the front track hole wall 102. The leg 90 is formed with an elongated protrusion 130 to increase its strength. The leg extends downwardly from an upper ground spring portion 131 which is elongated in a horizontal direction and includes the loop 112 and the card-engaging part 64 and side 127.

As shown in FIG. 7, the track 72 includes top and bottom card edge guides 132, 134 forming top and bottom inside corners 136, 138. As shown in FIG. 5, these inside corners engage top and bottom card corners 140, 142 to closely guide the card edge 144. The track forms a recess 150 lying outward of the top and bottom corners 136, 138, and the card-engaging part 64 of the grounding spring lies in this recess 150. The card-engaging part 64 has a height that is considerably less than that of the card, and is protected by lying in the track recess.

The card-engaging mechanism is substantially symmetrical about a vertical plane 160 (FIG. 2) and the second track and second grounding spring have constructions similar to that of the first track and first grounding spring.

Applicant has designed a grounding spring of the type shown in FIG. 9, which was constructed of plated phosphor bronze of 0.007 inch thick (0.18 mm) thickness, with a length A of 0.42 inch (10.7 mm), an inside gap B of 0.037 inch (0.94 mm), and an overall height C of 0.42 inch (10.7 mm). The height D of the card-engaging part was 0.097 inch (2.54 mm). This spring was designed for use in a card-engaging mechanism for engaging memory cards of the standard JEIDA construction wherein the cards have a thickness of 5 millimeters (0.197 inch).

It should be noted that terms such as "upper", "lower", "vertical" and the like have been used herein merely to aid in the description of the invention, and that the parts can be used in any orientation with respect to gravity.

Thus, the invention provides a card-receiving electronic device with a grounding spring that discharges static electricity on a card and thereafter keeps a portion of the card grounded. The grounding spring is constructed for low cost production, easy installation, and discharge of static electricity with minimal generation of electromagnetic interference. The grounding spring is formed of sheet metal with a card-engaging park and with a downwardly-extending leg that extends to a circuit board lying under the card-engaging mechanism to connect to a ground plane of the circuit board. The grounding spring has a forward end forming a substantially 180° loop that surrounds a forward end wall of a track hole, to stably support the grounding spring on the track of the card-engaging mechanism.

Although particular embodiments of the invention have been described and illustrated herein, it is recognized that modifications and variations may readily occur to those skilled in the art, and consequently, it is intended that the claims be interpreted to cover such modifications and equivalents.

In the claims:

1. A card-receiving electronic device that includes a circuit board having an upper surface, a plurality of conductive traces and a ground plane, said electronic device also including a card-receiving mechanism mounted over said circuit board upper surface with said mechanism including a pair of primarily horizontally-extending guide tracks that guide a card in longitudinal movement into and out of said mechanism, characterized by:

a grounding spring having an elongated upper portion forming a card-contacting part positioned along one of said guide tracks, and having a downwardly-extending leg with a lower leg end electrically connected to said circuit board ground plane.

2. The electronic device described in claim 1 wherein:

said circuit board has a plurality of feet-receiving holes and has a grounding hole with metal plated ground hole walls connected to said circuit board ground plane;

said lower leg end projects into said grounding hole and is connected to the metal walls of said grounding hole.

3. The electronic device described in claim 1 wherein:

said tracks guide said card in forward and rearward longitudinal directions respectively into and out of said mechanism;

said card-receiving mechanism includes first and second track walls forming said guide tracks with each track wall having an inner side facing a card and an opposite outer side, with a first of said track walls having a laterally-extending track hole therein forming front and rear track hole walls;

said grounding spring is formed of sheet metal and said upper portion has a rear end forming a loop with said loop being looped about said front track hole wall, with said leg extending from an outer side of said looped rear end.

4. The electronic device described in claim 1 wherein:

a first of said guide tracks has top and bottom card edge guides forming inside guide corners that guide edges of said card, said first guide track forms a recess between said edge guides, and said card-engaging part of said spring has a height that is less than the vertical distance between said guide corners and lies in said recess.

5. A combination of a card that contains electronic circuitry and an electronic device that has a slot for receiving said card, comprising:

a card receiving mechanism mounted on said electronic device, which includes a frame having a card-receiving slot and a pair of laterally spaced card-guiding tracks aligned with said card-receiving slot which guides said card in forward movement into said card-receiving slot, said card having a front end forming a connector and said card-receiving slot having a front end with a frame connector that includes multiple contacts, with said frame connector positioned to mate with said card connector when said card is fully inserted into said frame;

a circuit board lying under said card-receiving mechanism, said board having a plurality of conductive traces connected to said contacts of said frame connector, and said board having a ground plane;

said card having opposite edges that each have upper and lower corners and said card having at least one card ground contact connected to said electronic circuit, with said card ground contact lying at a first of said card edges;

a first of said tracks has upper and lower edge guides forming a recess with corners, that guides top and bottom corners of a first edge of said card;

a grounding spring having a card-contacting part lying in said recess and bearing against said card ground contact, said spring having a downwardly extending leg extending to said circuit board and electrically connected to said circuit board ground plane.

6. The combination described in claim 5 wherein:

said first track has an inner side facing said card and an opposite outer side, and said first track has a track hole at the level of said recess, said track hole having forward and rearward hole walls;

said grounding spring has a looped part extending in a substantially 180° loop about said track forward hole wall, with one end of said loop merging with card-contacting part and with the other end of said loop merging with said leg.

* * * * *